United States Patent [19]

McMasters et al.

[11] Patent Number: 5,764,579
[45] Date of Patent: Jun. 9, 1998

[54] SYSTEM FOR CONTROLLING LABORATORIES WITH FUME HOODS

[75] Inventors: David C. McMasters, Monroeville; David M. Fisher, Pittsburgh; Bruce D. Arnold, Murrysville, all of Pa.

[73] Assignee: American Auto-Matrix, Inc.

[21] Appl. No.: 591,541

[22] Filed: Oct. 1, 1990

[51] Int. Cl.$^6$ .................................................. B08B 15/02
[52] U.S. Cl. .............................. 364/131; 454/59; 454/61; 454/62; 454/340
[58] Field of Search ..................................... 364/131, 132, 364/133, 137, 138; 454/56–61, 62, 340

[56] References Cited

U.S. PATENT DOCUMENTS

| | | |
|---|---|---|
| 4,040,042 | 8/1977 | Mayer . |
| 4,160,407 | 7/1979 | Duyin .................................. 454/61 |
| 4,528,898 | 7/1985 | Sharp et al. ......................... 454/61 |
| 4,557,184 | 12/1985 | Orii et al. . |
| 4,706,553 | 11/1987 | Sharp et al. ......................... 454/61 |
| 4,741,257 | 5/1988 | Wiggin et al. ....................... 454/59 |
| 4,773,311 | 9/1988 | Sharp ................................. 454/56 |
| 5,090,303 | 2/1992 | Ahmed ............................... 454/58 |
| 5,090,304 | 2/1992 | Egbes et al. ........................ 454/59 |
| 5,092,227 | 3/1992 | Ahmed et al. ....................... 454/59 |

OTHER PUBLICATIONS

"SOLO/FX, Preliminary Production Description" dated Nov. 14, 1988.
"SOLO/FX" by American Auto-Matrix, copyrighted in 1989.
"NETWORK" by American Auto-Matrix dated Spring/Summer 1989.
"SOLO/FX Hood/Lab Control" by American Auto-Matrix dated about Jan. 1989.
"Face Velocity Control Systems" brochure by Anemostat, copyright 1984.
"Yamato Clean Benche" product description brochure.
"Envirotrak—A Laboratory Air Flow Control System from Anemostat" dated Aug. 1985.
"Total Lab Control for the 90's TLC-90" by Anemostat, copyrighted in 1988.
Information Disclosure Statement/Declaration of Linda Diss and attachments thereto.
Information Disclosure Statement/Declaration of Richard Fish and attachments thereto.

Primary Examiner—Reba I. Elmore
Assistant Examiner—Thomas E. Brown
Attorney, Agent, or Firm—Reed, Smith, Shaw & McClay

[57] ABSTRACT

A system for controlling laboratories having fume hoods comprising a network along which information is carried. The system is also comprised of a controller in contact with the network for receiving information from and providing information to the network. Additionally, the system is comprised of means for sensing a laboratory's state. The sensing means is disposed in each laboratory. There is additionally a microprocessor disposed in each laboratory for receiving information concerning the laboratory from the respective sensing means and the controller in order to maintain the laboratory in a predetermined state, and to provide information about the laboratory to the controller.

54 Claims, 8 Drawing Sheets

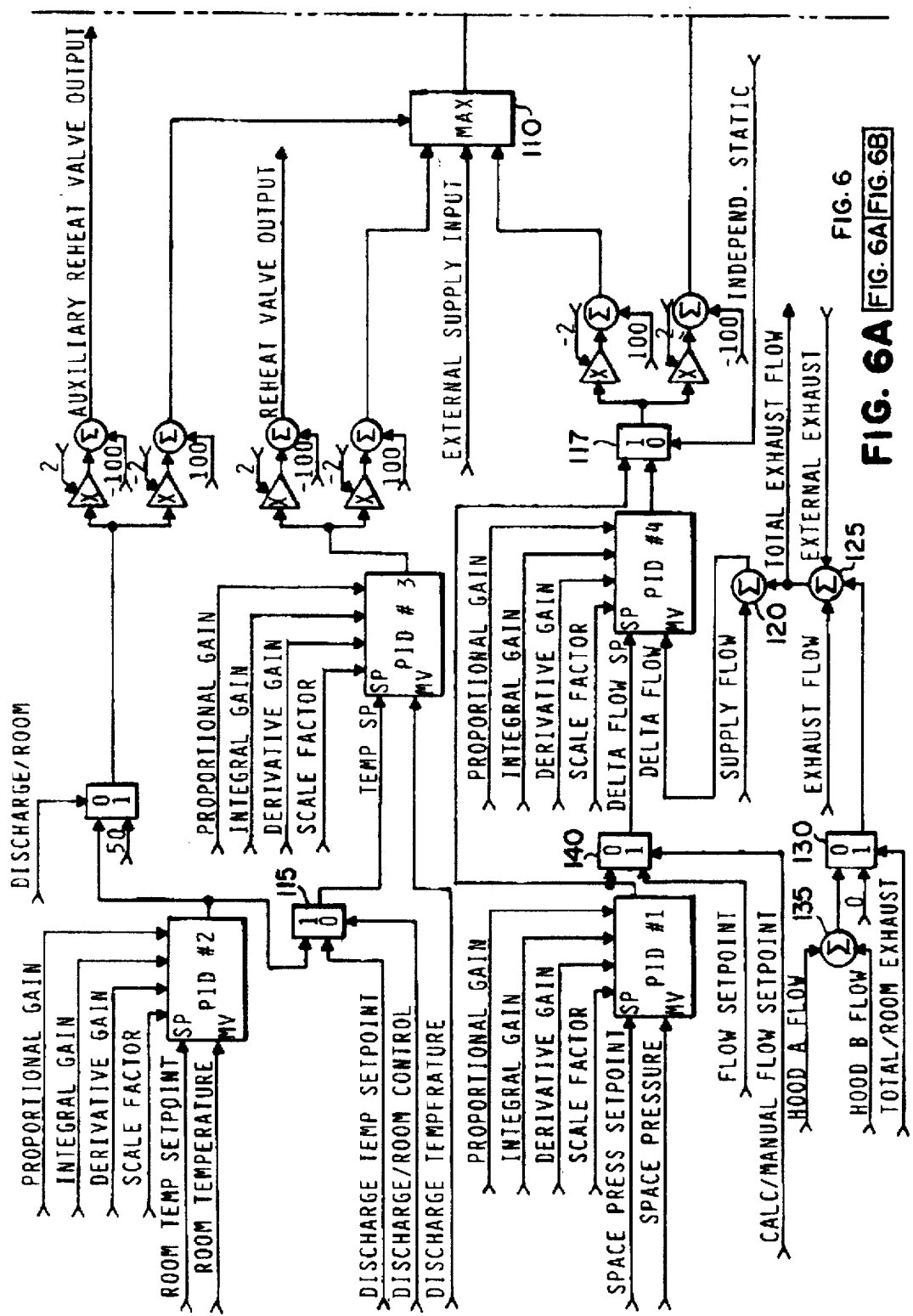

C = A + B

B = 1 / A

C = A * B

IF C = 0 THEN D = B
　　　IF C = 1 THEN D = A

D = TRUE (HOLD) FOR
　　　(C / A) * B SECONDS

D = A * (B - C) + C
　　　0% < A < 100%

E = MAXIMUM OF A, B,
　　　C, OR D

SYSTEM FOR CONTROLLING LABORATORIES WITH FUME HOODS

FIELD OF THE INVENTION

The present invention is related to systems for controlling laboratories with fume hoods. More specifically, the present invention is related to a system for controlling laboratories with fume hoods using a network to communicate with a remote controller to control the state of the laboratory.

BACKGROUND OF THE INVENTION

Laboratories wherein dangerous experiments or processes are performed require protections for the workers and the experiments in the laboratory. One very common protection found in laboratories are fume hoods in which chemical reactions are conducted. The fume hoods have air drawn out of them thus essentially preventing any toxic fumes from escaping the fume hood into the laboratory and threatening the operators. The velocity of air drawn through the fume hood sash is controlled to a value high enough to maintain safety for the operator and low enough to provide non-turbulent air for the experiment of process.

An additional protection that can be provided is to maintain the static pressure in the laboratory at a lower or higher pressure than the pressure in the surrounding corridors of the building. A lower pressure would prevent contaminants from exiting the laboratory in the case of an accident.

A higher pressure would prevent contaminants from entering the laboratory, as is the case in a clean room. Also, control of the laboratory climate is required both for operator comfort and for certain experiments or processes where strict temperature and humidity control are necessary.

There are many schemes and apparatuses that provide such control and protection to laboratories. However, heretofore, there have been no systems that provide for integrated direct digital control of laboratories.

SUMMARY OF THE INVENTION

The present invention pertains to a system for controlling laboratories having fume hoods. The system is comprised of a network along which information is carried. The system is also comprised of a controller in contact with the network for receiving information from and providing information to the network. Additionally, the system is comprised of means for sensing a laboratory's state. The sensing means is disposed in each laboratory. There is additionally a microprocessor disposed in each laboratory for receiving information concerning the laboratory from the respective sensing means and the controller in order to maintain the laboratory in a predetermined state, and to provide information about the laboratory to the controller.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
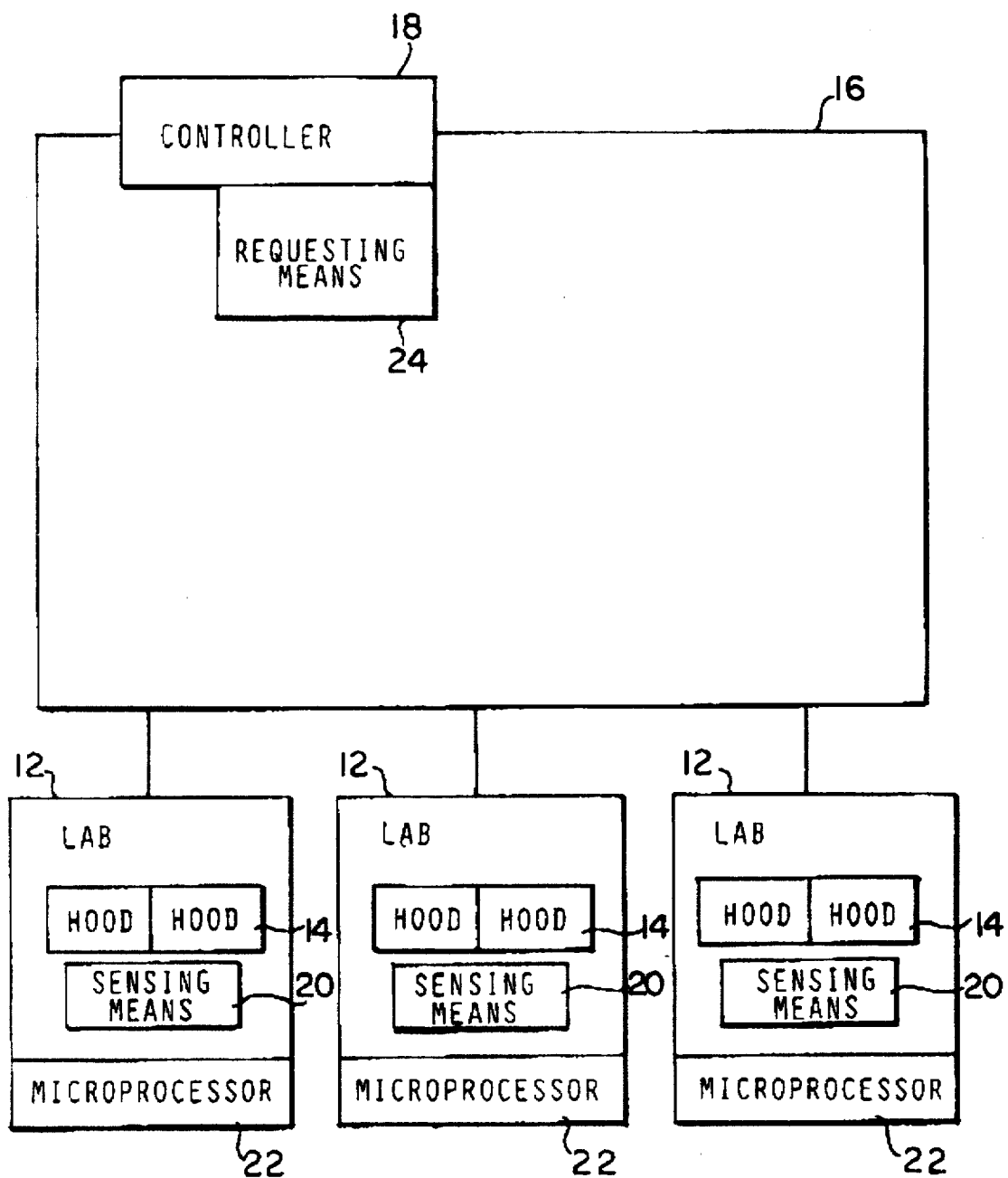
FIG. 1 is a schematic representation of a system for controlling laboratories having fume hoods.

Referring now to the drawings wherein like reference numerals refer to similar or identical parts throughout the several views, and more specifically to FIG. 1 thereof, there is shown a schematic representation of a system 10 for controlling laboratories 12 having fume hoods 14. The system 10 is comprised of a network 16 along which information is carried. Preferably, the network 16 operates in the half-duplex mode, for instance, with a two-wire RS485 network.

The system 10 is also comprised of a controller 18 in contact with the network 16 for receiving information from and providing information to the network 16. Preferably, the controller 18 includes means 24 for requesting information from each microprocessor 22 about its condition. Preferably, the requesting means 24 requests information from each microprocessor 22 one at a time.

Figure 2:
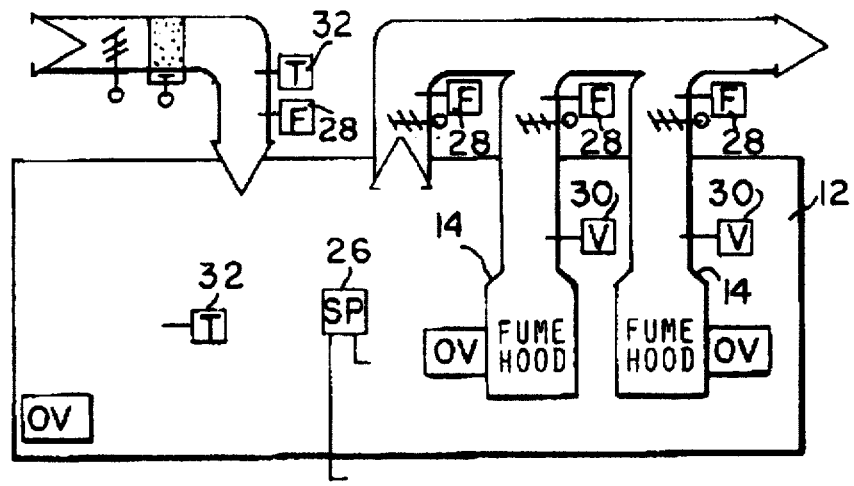
FIG. 2 is a schematic representation of a laboratory.

Additionally, the system 10 is comprised of means 20 for sensing a laboratory's 12 state. The state of the laboratory is defined as, at least, the static pressure and the supply/exhaust differential of the laboratory 12, and also the face velocity of the fume hood 14 in the laboratory. The sensing means 20 is disposed in each laboratory 12. The sensing means 20 preferably includes a static pressure sensor 26, a supply/exhaust differential sensor 28 and a face velocity sensor 30 disposed in each laboratory 12, as shown in FIG. 2. FIG. 2 is a schematic representation of the laboratory 12. There can also be included a temperature sensor 32.

There is also a microprocessor 22 disposed in each laboratory 12 for receiving information concerning the laboratory 12 from the respective sensing means 20 and the controller 18 in order to maintain the laboratory 12 at a predetermined state, and to provide information about the laboratory 12 to the controller 18. Preferably, the controller 18 and the microprocessors 22 maintain the respective laboratory 12 in the predetermined state by maintaining their respective static pressure and supply/exhaust differential as well as the face velocity of the hoods 14 of a given laboratory 12.

The controller 18 and microprocessors 22 preferably operate in a master slave relationship with the controller 18 being the master and the microprocessor 22 being the slave. The master initiates all communications by sending messages. Messages are composed, for instance, of data bytes transmitted serially using standard asynchronous data frames. These data frames can consist of one start bit, eight data bits, no parity bit, and one stop bit.

The master and each slave share the same network 16 for transmitting and receiving (half-duplex). The master and each slave must be able to enable/disable their transmitters (not shown), so as not to interfere with other slaves' transmissions. The transmitter enable/disable should be controlled such that the carrier enable is switched off concurrently with the end of the final stop bit of any transmission. The master arbitrates when a given slave may respond with the simple rule that a slave only transmits in response to a message uniquely directed to it. See PUP guidelines (A document entitled "PUP Protocol Guidelines" is available from American Auto-Matrix, Inc. Please contact the PUP Protocol Committee and request Version 6.) for an example of a protocol that can be used in the system.

Figure 3:
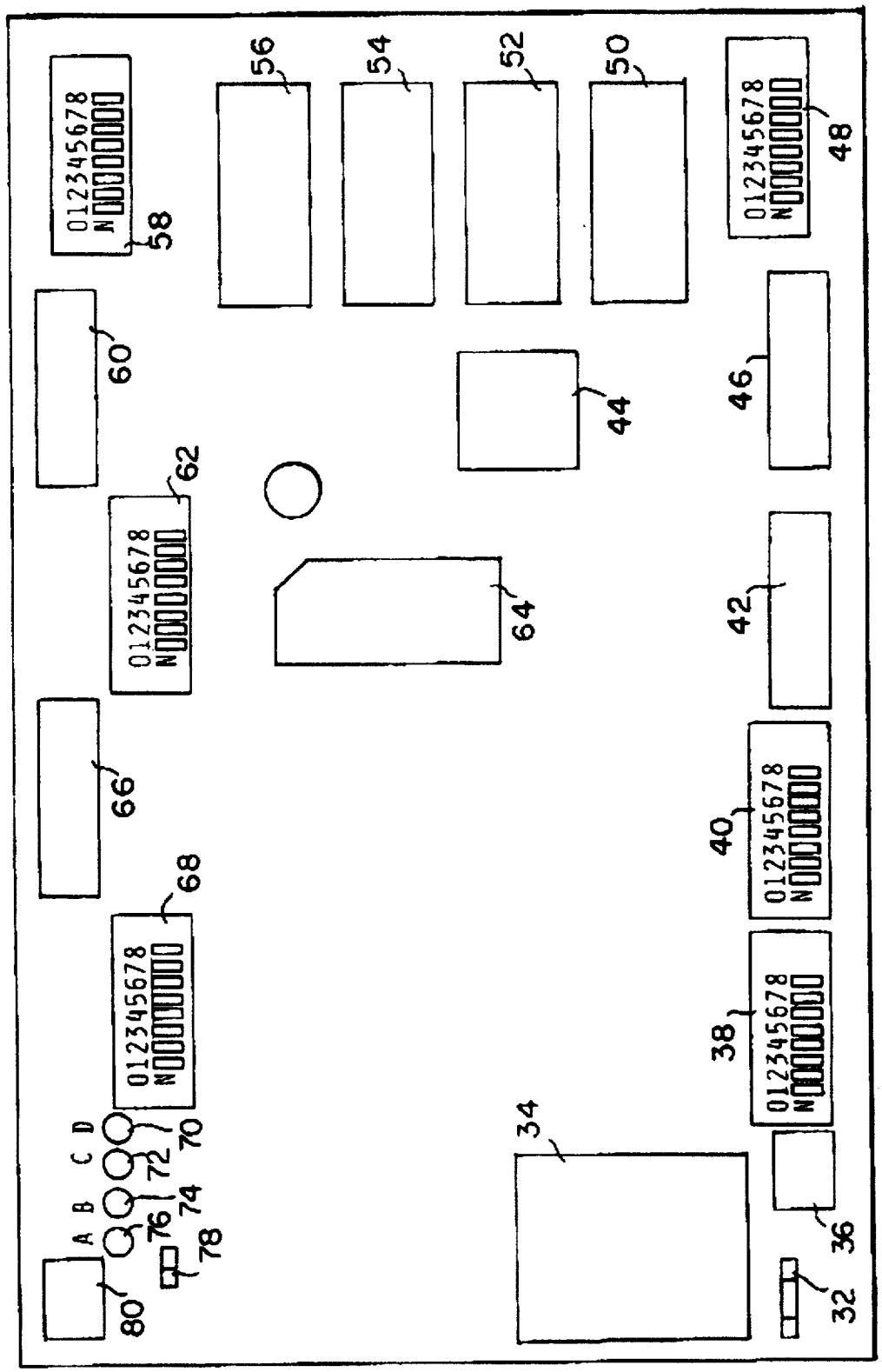
FIG. 3 is a schematic representation of a microprocessor.

In the operation of the preferred embodiment, a microprocessor 22 is disposed in each laboratory 12, as shown in FIG. 3. FIG. 3 is a schematic representation of the microprocessor 22. The microprocessor 22 is comprised of a fuse 32 which protects the microprocessor 22 from electrical overload. There is a transformer 34 for converting current and voltage provided to the microprocessor 22 through the power input port 36. There is a first switch block 38 with eight switches used to select thermister support for eight analog inputs. When any given switch is on (moved to the right), it operates as a thermister and when any given switch is off (moved to the left), the switch operates in a normal mode, as is well known in the art.

There is a second switch block 40 with eight switches used to select a current or voltage mode for analog inputs one through eight. When the switch is off, the voltage mode is utilized and when the switch is on, the current mode is utilized. There is an analog input port 42 which receives analog input wiring, i.e., high resolution (12-bit) input devices such as flow sensors, velocity sensors, the static pressure sensor, and the discharge air temperature sensor are hardwired (connected) to the analog input port 42 (TB3). A processor 44 processes the information received by the microprocessor from the network 16 and sensors in the laboratory 12 and also provides information concerning the respective laboratory 12 to the network 16. A universal input wiring input port 46 receives analog/digital input wiring, i.e., low resolution (8-bit) and digital input devices such as the room temperature sensor, sash position sensors, the humidity sensor, and the emergency contacts are hardwired to input port 46 (TB1). A third switch block 48 with eight switches is used to select thermister support for the universal input port 46 inputs one through eight.

The memory for the microprocessor 22 includes an executive eprom 50, a nonvolatile ram 52, an application eprom 54 and an expansion eprom/ram 56. The executive eprom 50 contains the basic operating routines of the microprocessor. Input/output, communications, diagnostics, and initialization routines as well as the utility routines for the application which include but are not limited to the math functions and the PID control routines.

The non-volatile ram 52 is used for work space for the executive and the application as well as for storage of attributes and control parameters.

The application eprom 54 contains the laboratory/fumehood control algorithms.

The expansion eprom/ram 56 is used for extra application algorithm storage or for extra non-volatile ram storage. In the present SOLO/FX configuration, this site is unused.

There is a fourth switch block 58 with eight switches that can be used as determined for a given situation. The digital (binary) output port 60 is used to connect devices to the microprocessor for annunciating alarm conditions and for general purpose digital outputs. A fifth switch block 62 with eight switches is used to select a current or a voltage mode for analog outputs five through eight of analog output port 66. There is a three-volt lithium smart battery 64 used to maintain the data in the ram 52 in the event of a power failure. There is a sixth switch block 68 that has eight switches that are used for analog outputs one through four of analog output port 66 to determine whether they should be in a current or voltage mode.

A first led 70 indicates whether the application eprom 54 is installed in the microprocessor 22. If the led 70 is off, it indicates that the application eprom 54 is installed in the microprocessor 22. A second led 72, when flashing, indicates that the microprocessor 22 is operating properly. A third led 74, when on, indicates that the microprocessor 22 is transmitting data to the controller 18. A fourth led 76 indicates when the microprocessor 22 is receiving data.

There is a jumper block 78 with two pins. When the jumper block 78 is installed, a termination resister is positioned for the RS485 network 16. The microprocessor 22 connects to the network 16 through the network connection port 80.

Figure 5:
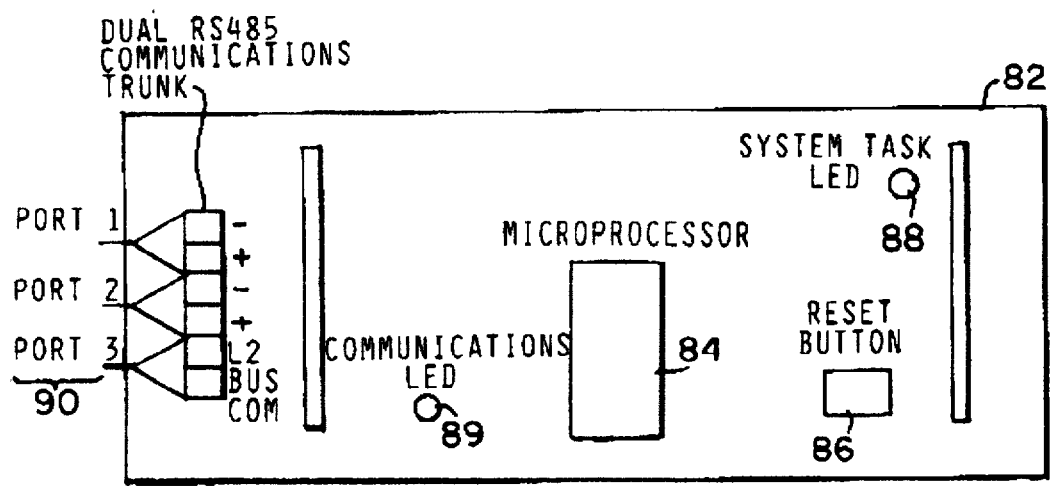
FIG. 5 is a schematic representation of a module.
Figure 4:
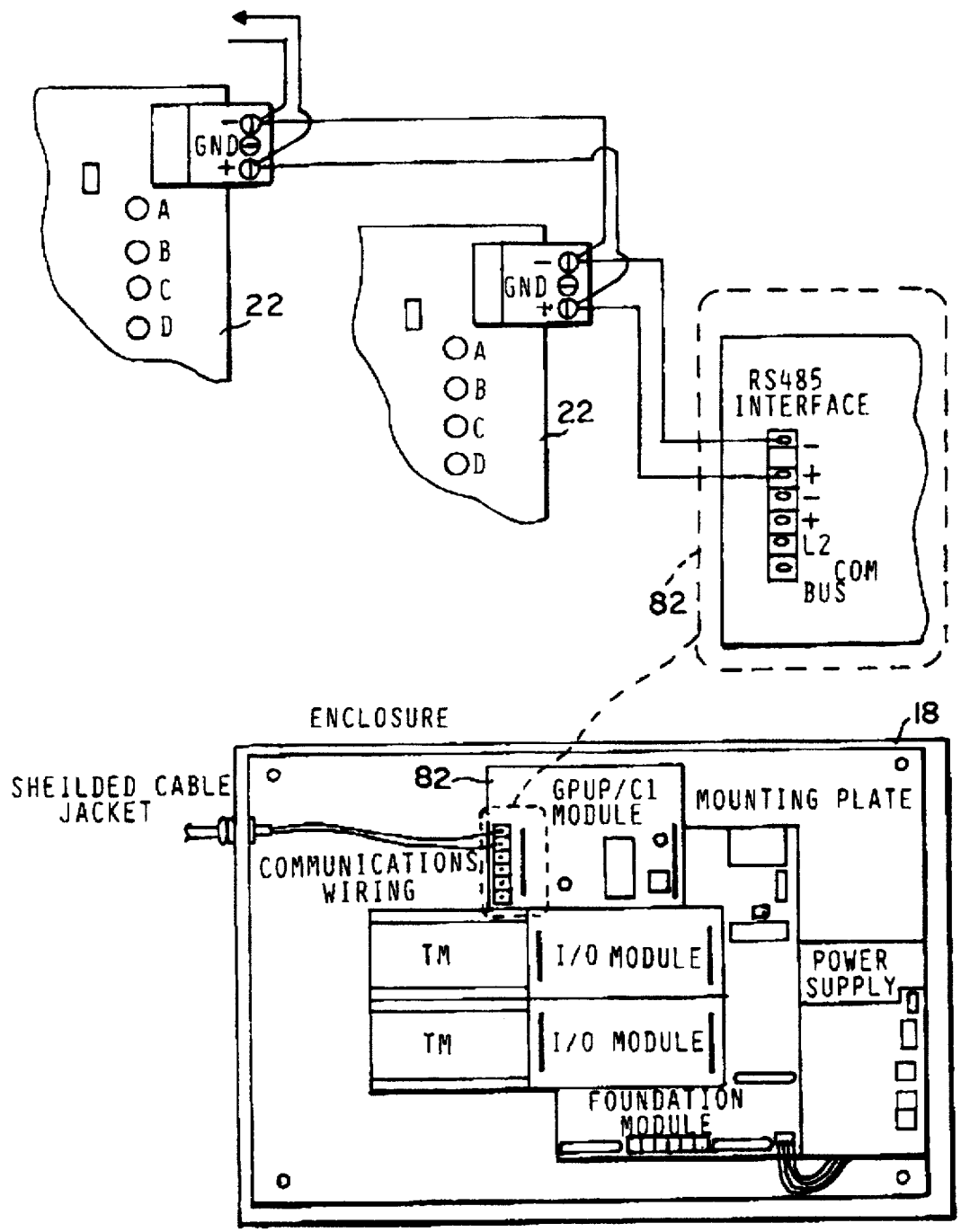
FIG. 4 is a schematic representation of the network configuration.

The controller 18, as shown in FIG. 4 which is a schematic representation of the network configuration, includes a module 82. FIG. 5 shows a module 82 and is a schematic representation of the module 82. The module 82 includes a module processor 84 for providing the proper instructions to the various laboratory 12 microprocessor 22 via the network 16, as well as for receiving information to better maintain the overall system 10 from the various microprocessors 22 and the laboratories 12. The module 82 also includes a reset button 86, a system task led 88 and a communications led 89. The reset button 86 is used to reset the communication module 82 without resetting the entire STAR controller 18. The system task LED 88 is lit to indicate that the communication module 82 task is currently being serviced. The communication LED 89 is lit when the communication module 82 is idle, i.e. not transmitting. There are also ports 90 which connect the module 82 to the dual RS485 communications network 16. In general, for the preferred embodiment, the inputs and outputs are the following:

Analog Inputs
AI1 Space Static Pressure
AI2 Supply Air Flow
AI3 Exhaust Air Flow
AI4 Hood A Air Flow
AI5 Hood B Air Flow
AI6 Hood A Face Velocity
AI7 Hood B Face Velocity
AI8 Discharge Air Temperature
Universal Inputs
UI1 Room Temperature—8-bit Analog
UI2 Hood A Sash Area—8-bit Analog
UI3 Hood B Sash Area—8-bit Analog
UI4 External Supply Damper/Humidity Input—8-bit Analog
UI5 External Exhaust Flow Input—8-bit Analog
UI6 Space Emergency Contact—Digital
UI7 Hood A Emergency Contact—Digital
UI8 Hood B Emergency Contact—Digital
Analog Outputs
AO1 Supply Damper Position
AO2 Reheat Valve Position
AO3 Exhaust Damper Position
AO4 Hood A Damper Position
AO5 Hood B Damper Position
AO6 Auxiliary Reheat Valve Position
AO7 Total Exhaust Air Flow
AO8 Humidity Cooling Valve Position
Digital Outputs
DO1 Space Emergency Output
DO2 Hood A Emergency Output
DO3 Hood B Emergency Output
DO4 High Limit Output DO5 Low Limit Output
DO6 Digital Output 6—Unused
DO7 Digital Output 7—Unused
DO8 Digital Output 8—Unused A given module can be networked with up to 32 microprocessors 22 in series as shown in FIG. 4. The module 82 can be integrated into a STAR which serves as the controller 18. The STAR is a microprocessor based, multitasking field panel for monitoring and controlling devices which include the communication module 82. More information can be found in a document entitled "STAR User Manual" American Auto-Matrix part number 1E-04-00-0054.

Figure 6B:
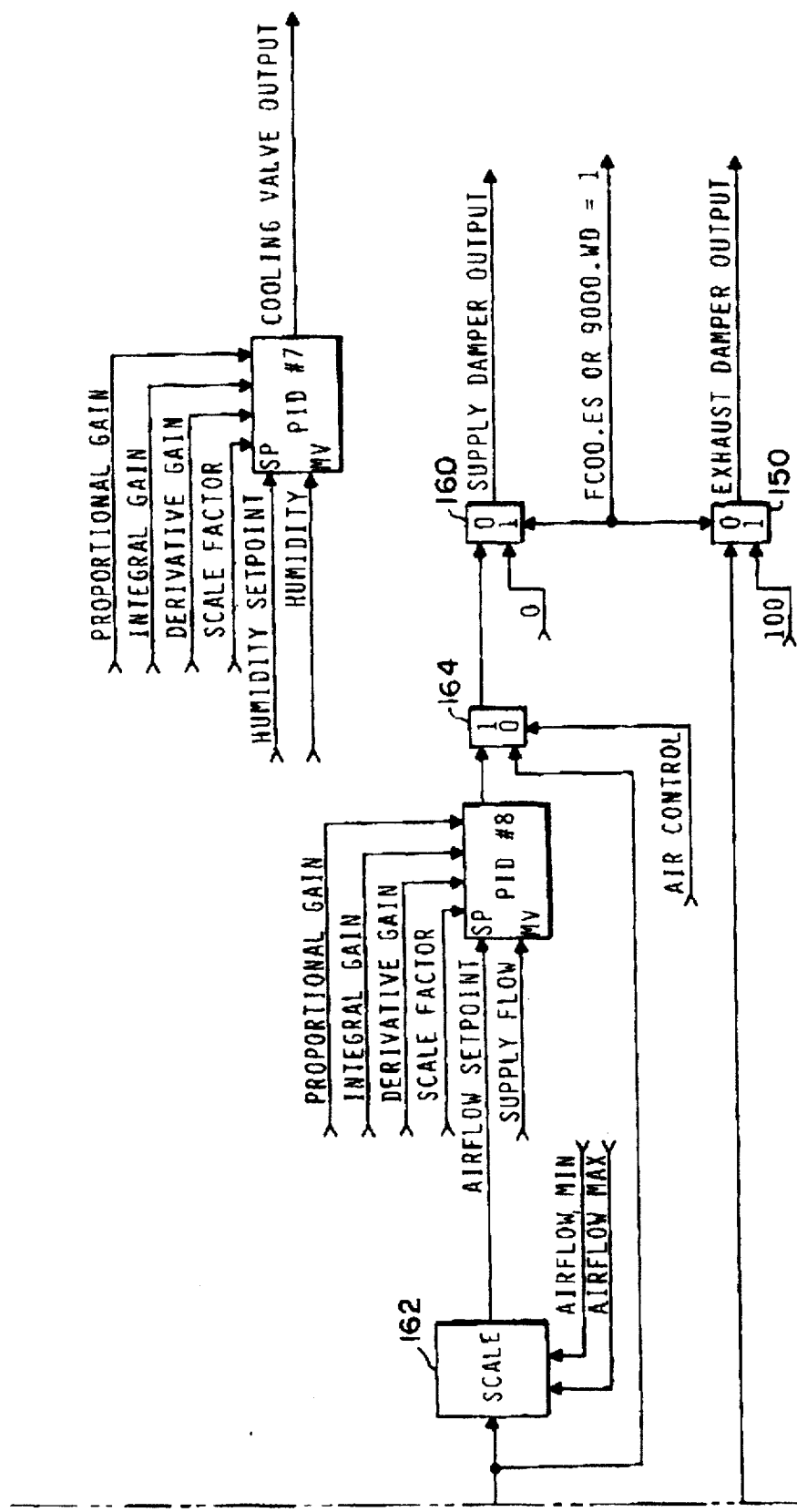
FIG. 6 is a schematic representation of the laboratory control circuit.

A laboratory is controlled by, for instance, the laboratory control circuit 100 as shown in FIG. 6. A discussion of its control sequence follows. There are preferably four elements of the control sequence. These are temperature, static pressure, humidity and delta flow with respect to a room under the control of the laboratory controller 100. The four variables that can be manipulated in order to obtain the desired temperature, static pressure, humidity and delta flow is a supply damper, which controls the amount of air flow into the room; an exhaust damper, which controls the amount of air flow out of the room; a cooling valve which dehumidifies the air; and the reheat valve, which controls the amount of heat provided to the flow of air that passes through the supply damper into the room.

Specifically, the control sequence with respect to the control of temperature in the room preferably has two possible procedures that can be used to introduce additional heat, less heat or the same amount of heat into the room. The first procedure utilizes a temperature sensor 32 which determines the room temperature and provides a corresponding signal to the measured variable (MV) input of PID No. 2, as shown in FIG. 6. PID No. 2 also receives in its set point (SP) input a room temperature set point signal which corresponds to a desired room temperature.

The PID No. 2 provides an error signal corresponding to the difference between the room temperature and the room temperature set point. This error signal provided by PID No. 2 is then used as the temperature set point input which is provided to the SP input of PID No. 3. The PID No. 3 also receives a discharge temperature signal through its MV input which corresponds to the temperature of the air entering the room through the supply damper. PID No. 3 then provides an error signal that corresponds to the error between the discharge temperature and the temperature set point. This error signal from PID No. 3 is then used to control the reheat valve. The output of PID No. 2 can optionally be used to control an auxiliary reheat valve if one is present in the room.

The control of the reheat valve can be better understood with the following examples. If the error signal, for instance, from PID No. 3 indicates that the discharge temperature is not yet hot enough to obtain a desired temperature in the room, then the reheat valve will open further to allow additional heat to be supplied to the air flow passing into the room through the supply damper. If the error signal from PID No. 3 is, for instance, too high, then the reheat valve is caused to allow less heat to be provided to the flow of air into the room through the supply damper. The error signal from PID No. 3 is also provided to a maximum switch 110 which is involved with the control of the supply damper. The control of the supply damper will be discussed below.

The second procedure that can be used to control temperature is for the temperature set point to be manually inputted into the SP input of PID No. 3. This is done by toggling a switch 115 disposed between the PID No. 2 and PID No. 3 of the lab control diagram such that its 0 input passes the manual temperature set point signal (as opposed to the 1 input of the switch 115 with respect to the first procedure which passes the error signal from PID No. 2). By choosing the manual temperature set point input, the signal provided by PID No. 2 is eliminated and a fixed temperature set point is then provided to the PID No. 3. The subsequent operation of the second procedure for controlling temperature in the room is the same as the operation of the first procedure described above for controlling the temperature starting from PID No. 3.

In order to control the static pressure and the delta flow in the room, a space pressure set point signal is provided to input SP of PID No. 1. The actual space pressure is provided to input MV of PID No. 1. An error signal corresponding to the difference in these signals is then produced from PID No. 1 and is the delta flow set point signal provided to input SP of PID No. 4. (Recall that static pressure and delta flow are related since static pressure is constant when delta flow is zero; and static pressure is changing in the direction of increasing or decreasing delta flow when delta flow is changing). Thus, PID No. 1 provides the delta flow set point that corresponds to the difference between the actual static pressure in the room and the desired static pressure in the room. If the actual static pressure is the desired static pressure, then the delta flow set point signal is essentially zero. If the actual static pressure is different than the desired static pressure, then the delta flow set point signal corresponds to this difference. The actual delta flow signal in the room is provided to the MV input of PID No. 4. Optionally, PID No. 1 can be used to directly control the supply and exhaust (static pressure) in a room without utilizing flow sensors by way of switch 117.

PID No. 4 produces an error signal corresponding to the difference in the delta flow set point signal and the actual delta flow signal. This error signal from PID No. 4 is then provided to the exhaust damper output. The exhaust damper is accordingly moved in response to the command placed on it from the signal of PID No. 4. The error signal from PID No. 4 is also provided to the maximum switch 110 to which the error signal PID No. 3 is also provided.

The maximum switch 110 allows the greatest of four signals (auxiliary reheat, reheat, static pressure and external supply) to pass to the supply damper output. It is the greatest of these four signals which controls the supply damper. This way, for instance, if more heat is to be provided to the room in order to increase the temperature of the room, then the supply damper will also increase the flow of heated air into the room. If, the signal from PID No. 4 is greatest than the signal from PID No. 3 due to, for instance, the static pressure, or the delta flow being increased, then the supply damper will provide a greater flow of air to the room in order to increase the static pressure or the delta flow.

With respect to the delta flow signal provided to the MV input of PID No. 4, the signal is essentially the difference between the supply flow into the room and the exhaust flow out of the room. The exhaust flow out of the room is determined one of two ways. In the event that a sensor determines the overall exhaust flow from a room, then this value is subtracted from the supply flow into the room at subtractor 120 to yield the delta flow of the room. If the exhaust flow sensor is disposed such that it only determines exhaust flow out of the room but does not determine the exhaust flow out of the room from a hood A and a hood B, then the total exhaust flow is determined by adding the exhaust flow out of the room plus the addition of the exhaust flow out of hood A and hood B at summer 125. The aforementioned is reduced to practice in part with a switch 130 toggled to allow the appropriate signal to pass. If the sensor determines the overall flow out of a room, then the switch 130 is toggled to allow a zero input signal to pass through the 1 input of the switch 130. If the exhaust sensor is disposed such that only the exhaust of the room less the exhaust out of hood A and hood B is sensed, then the switch 130 is toggled such that the sum of the exhaust out of hood A and hood B (accomplished with summer 135) is passed through the input of the switch 130 to be added at summer 125 to the exhaust flow from the room.

Alternatively, the delta flow set point signal can be manually set by toggling a switch 140 between PID No. 1 and PID No. 4 to only allow a manual flow set point signal to pass through the switches input (as opposed to allowing the delta flow set point signal of PID No. 1 to pass through the input of the switch 140).

In the event it is desired to manually control the exhaust damper and the supply damper such that they are fully open or fully shut, respectively, by properly toggling switch 150 and switch 160, respectively, a 100% open or 0% open signal, respectively, is provided to the switches 1 inputs and is passed therethrough to open or close the exhaust and supply dampers, respectively. In this manner, the room can be quickly depleted of air, if, for instance, a fire or toxic chemical release occurs. If the switch 50 and switch 60 is toggled such that the signal at their 0 inputs are passed therethrough, then the signals from PID No. 4 or from the maximum switch 10 is passed to the exhaust or supply damper, respectively.

Optionally, to maintain a minimum air flow into a room, which provides for a minimum number of air changes for a given time (per hour) in a room, the output signal from switch 110 is received by both scaler 162 and switch 164 (if it is desired not to maintain a minimum air flow, then switch 164 is set to 0 and the output from switch 110 passes directly to switch 160). Scaler 162 receives a minimum and maximum air flow range. Scaler 162 then scales the output signal from switch 110 to be in an allowable air flow range. The output signal from scaler 162 is then provided to the SP input of PID No. 8. The MV input of PID No. 8 receives a supply flow signal indicating the supply flowing through the supply damper and outputs a signal to switch 164 which is then provided to the supply damper.

The humidity control is accomplished by PID No. 7 receiving through MV input the humidity sensed by a humidity sensor in the room. The humidity set point is predetermined and provided to the SP input. The output of PID No. 7 controls a cooling valve based on the level of humidity in the room. If the humidity is too high, then the cooling valve is opened further. This causes the room temperature to drop thus causing the humidity in the room to drop.

The control sequence with respect to the flow of air through a hood 14 is based on, in general, coordinating the sash area of the hood 14 with the hood exhaust damper opening. When the sash area is increased, the damper opening is also increased in order to remove the additional volume of air that is provided to the hood (because of the increased sash area) and thus maintain the desired face velocity. When the sash area is decreased, the damper opening is also decreased in order to prevent the smaller volume of air through the smaller sash area from being drawn too quickly through the damper opening. Consequently, the desired face velocity is again maintained.

Figure 7:
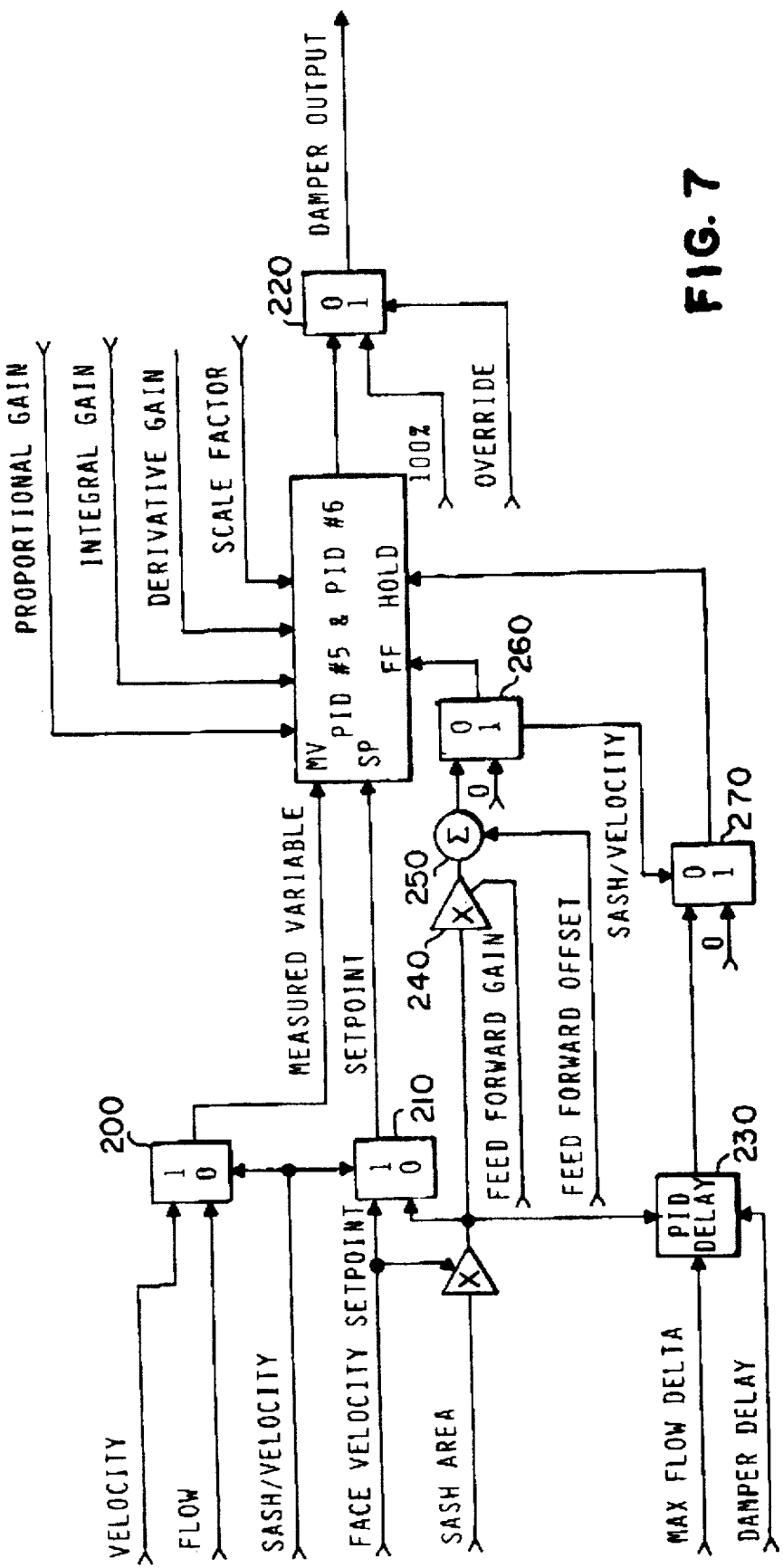
FIG. 7 is a schematic representation of a hood control circuit.
Figure 8:
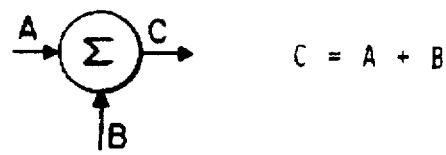
FIG. 8 is a key, with respect to elements of FIGS. 6 and 7, defining them.
Figure 8:
Figure 8:
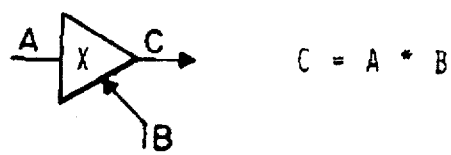
Figure 8:
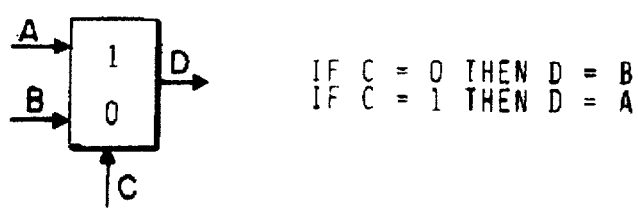
Figure 8:
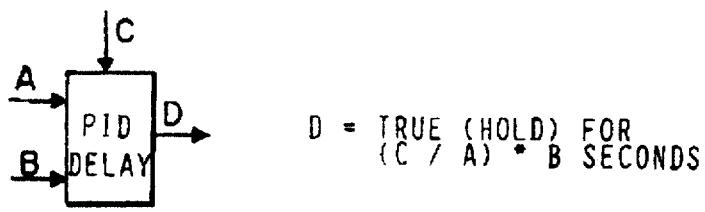
Figure 8:
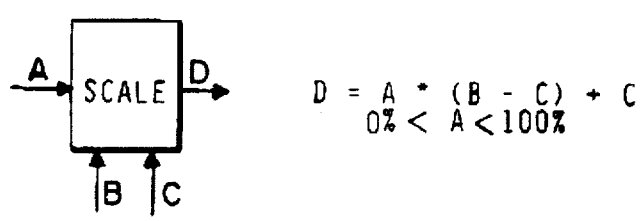
Figure 8:
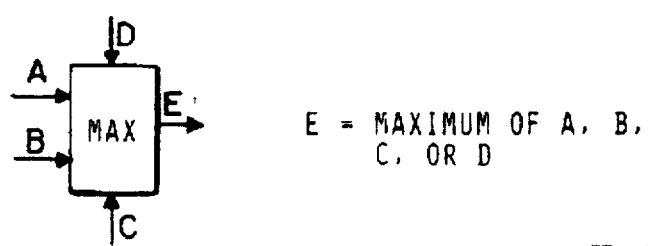

The control sequence provides for control of either face velocity for velocity control, or face velocity multiplied by sash area for flow control (see FIG. 7). If face velocity is chosen as the basis for measurement, then the 1 input of switch 200 receives the velocity signal corresponding to the face velocity of the hood. This face velocity signal is passed through switch 200 to the MV input of PID No. 5 and PID No. 6 (PID No. 5 controls a first hood and PID No. 6 controls a second hood). Additionally, through switch 210's one input is received a face velocity set point signal which is then passed through switch 210 to the set point SP input PID No. 5 and PID No. 6. The face velocity signal received at input MV is compared to the set point signal received at input SP and an error correction signal is outputted from PID No. 5 and PID No. 6 and provided to switch 220. If switch 220 is not toggled to an override position, then the signal outputted from PID No. 5 and PID No. 6 is then passed directly to the exhaust damper of the hood positioning it to be in a desired location. In the event that the override mode is toggled on switch 220, then the output signal from switch 220 causes the exhaust damper to take a fully opened position and allow the maximum possible exhaust to be obtained.

Alternatively, if the flow control is used as a basis to maintain the exhaust damper, then the 0 input of switch 200 receives the sensed flow through the exhaust. This signal is then passed directly through switch 200 to the MV input of PID No. 5 and PID No. 6. Switch 210 passes through the signal at its 0 input. This signal is the sash area of the hood multiplied by the face velocity set point. This resulting signal is provided to the SP input of the PID No. 5 and PID No. 6.

The set point signal provided by multiplying the face velocity set point by the sash area is additionally fed to a PID delay 230 as well as to a multiplier 240. At the multiplier 240, the signal is multiplied by a feed forward gain that provides a course adjustment signal which is received by summer 250. Summer 250 adds the course adjustment signal from multiplier 240 to a feed forward offset signal. This summed signal is provided to switch 260.

If the velocity mode is toggled, then a 0 output from switch 260 is provided to the PID No. 5 and PID No. 6. If the sash mode is chosen, then the signal received from summer 250 is passed to the FF input of PID No. 5 and PID No. 6. The feed forward offset signal is based on the parameters of the system such as the duct configuration and hood size. The ultimate purpose of the feed forward gain and feed forward offset being provided to the set point signal in the sash mode is to allow the exhaust damper to properly compensate for the situation where the sash area and thus the damper is suddenly changed. The exhaust damper lags in time in terms of how it compensates for this change in sash area. In order to eliminate or minimize the offshoot that the exhaust damper experiences from the sudden change in the sash area, the signal received by input FF causes the exhaust damper to move to the desired course position. The PID No. 5 and PID No. 6 utilizing the inputs from input MV and input SP then places the exhaust damper in an essentially fine adjustment until it arrives at a desired position.

The set point signal, arrived at by multiplying the face velocity set point time to sash area in the sash mode is also provided to PID delay 230. The PID delay 230 produces a signal based on the time it takes the damper to achieve full actuation (provided through the damper delay input to the PID and based on the maximum flow through the damper when it is fully opened). This delay signal is provided to switch 270 which, if the sash mode is being utilized, is then provided directly to the hold input of PID No. 5 and PID No. 6. The signal received at the hold input prevents the PID No.

5 and PID No. 6 from calculating the fine adjustment of the exhaust damper for a period of time determined by the signal provided at the hold input until the course adjustment has had time to reposition the exhaust damper. After the time period has passed, then the fine tuning of the exhaust damper position is allowed to continue using the MV input and SP input of PID No. 5 and PID No. 6.

The control sequence provides for control of either face velocity for velocity control or face velocity multiplied by sash area for flow control.

Accordingly, at least the following features are provided:

1. Fume hood air velocity control for safety of the operator and/or integrity of the experiment/process.
2. Control of room pressure to maintain safety or to prevent contamination.
3. Control of room temperature and humidity for comfort and for process requirements.
4. Integration of velocity, pressure and climate control with a direct digital control system.

The sash area of a fume hood is calculated from a formula which permits several methods of measurement which derive their input from a universal input connected to some type of sensor, usually a multi-turn potentiometer connected to a drum or pulley which is directly attached to the sash. The formula takes into account several parameters which can be programmed by the user to model the specific fume hood and sash system.

The formula used for calculating the sash position is shown in the following equation:

$$Area = OA + [GA*PI*SR*(UI/255)*[SD+ST*SR*(UI/255)]/12]$$

Where:

OA Offset Area—minimum sash opening, SQ FT

GA Sash Width—width of sash opening, FT

SR Pot Turns Per 100%—number of turns the post has from endstop to endstop

UI Universal Input—8-bit analog input which measures the pot voltage

PI Pi—3.1416

SD Drum Diameter—diameter of drum or pulley to which the pot is attached, IN

ST Cable Thickness—thickness of the cable used if the pot is attached to a drum which coils the cable, IN This equation accounts for the added diameter of the drum caused by the coiled cable. In the case of a system with a pot connected directly to a pulley, the ST, cable thickness, attribute would be set to zero and the drum diameter would simply be SD.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for controlling laboratories having fume hoods comprising:

a network along which information is carried;

a controller in contact with the network for receiving information from and providing information to the network;

means for sensing a laboratory's state disposed in each laboratory;

a microprocessor disposed in each laboratory for receiving information concerning the laboratory from the respective sensing means and the controller in order to maintain the laboratory in a predetermined state, and to provide information about the laboratory to the controller.

2. A system as described in claim 1 wherein the controller includes means for requesting information from each laboratory about its condition.

3. A system as described in claim 2 wherein requesting means requests information from each microprocessor one at a time.

4. A system as described in claim 3 wherein the network operates in the half-duplex mode.

5. A system as described in claim 4 wherein the controller and the microprocessors maintains the respective laboratory in the predetermined state by maintaining the respective static pressure and supply/exhaust differential as well as the face velocity of the hoods of a given laboratory.

6. A system as described in claim 5 wherein the sensing means includes a static pressure sensor, a supply/exhaust differential sensor, and a face velocity sensor disposed in each laboratory.

7. A method for controlling laboratories having fume hoods comprising the steps of:

sensing a state of each laboratory having a fume hood;

providing information corresponding to the state of each laboratory with a fume hood to a perspective microprocessor associated with each laboratory;

providing information to a respective microprocessor from a controller at a remote location; and maintaining a respective laboratory in a predetermined state with the microprocessor based on the information received from the controller and the information corresponding to the state of each laboratory.

8. A method as described in claim 7 wherein the sensing step includes the steps of sensing a static pressure and a supply/exhaust differential of the respective laboratory, and a face velocity of a respective fume hood; and wherein the step of providing information corresponding to the state of each laboratory includes information about the static pressure and a supply/exhaust differential of the respective laboratory, and the face velocity of a respective fume hood.

9. A method as described in claim 8 including after the step of providing information to a respective microprocessor, there is the step of providing information to the controller by the respective microprocessor.

10. A method as described in claim 9 wherein the step of providing information to the controller includes the step of requesting information by the controller from a microprocessor, and the step of providing the information by the microprocessor to the controller only when the controller requests the information from the microprocessor.

11. A method as described in claim 10 wherein the step of requesting information includes the step of requesting the information from the microprocessor, one at a time.

12. Apparatus for monitoring and controlling a fume hood of the type which has an opening and at least one moveable sash door adapted to at least partially cover the opening as the fume hood sash door is moved, the fume hood having an exhaust duct for expelling air and fumes therefrom, said fume hood being of the type which has a filter housing and filter means for entrapping fumes and effluents, said apparatus comprising:

means for determining the size of the uncovered portion of the opening and for generating a position signal indicative of the determined size;

means for measuring the flow of air through the fume hood and generating a flow signal that is indicative of the flow of air therethrough;

modulating means for varying the flow of air through the fume hood responsive to a control signal being received from a controller means;

means for measuring the differential pressure across the filter housing and providing an electrical differential pressure signal that is proportional to the measured differential pressure; and controller means responsive to said position signal and said actual flow signal for controlling the flow modulating means to control the flow of air through the fume hood, said controller means generating a high filter loading signal responsive to said differential pressure signal exceeding a predetermined value.

13. Apparatus as defined in claim 12 further comprising means for generating a warning indication in response to said high filter loading signal being generated.

14. Apparatus as defined in claim 13 wherein said warning indication generating means comprises a means for providing a visual indication.

15. Apparatus as defined in claim 13 wherein said warning indication generating means comprises a means for providing an audible indication.

16. Apparatus as defined in claim 12 wherein said controller means is adapted to increase the flow of air through said fume hood to compensate for said filter loading in response to receiving said high filter loading signal.

17. A system for controlling the differential pressure within a room such as a laboratory or the like of the type which has one or more exit doors which can open either inwardly or outwardly of the room, the room being located in a building having a building heating and air conditioning apparatus, including a central monitoring station, the room having a plurality of fume hoods located within it, the fume hoods being of the type which have at least one moveable sash door adapted to at least partially cover the opening as the fume hood sash door is moved, each of the fume hoods having an exhaust duct that is in communication with an exhaust apparatus for expelling air and fume from the room, said system comprising:

a fume hood controller means for controlling a flow modulating means associated with each fume hood and its associated exhaust duct to provide the greater of the flow required to maintain a predetermined minimum flow through said exhaust duct or to maintain a desired face velocity through the uncovered portion of the opening;

said flow modulating means associated with each fume hood and adapted to control the air flow through the fume hood;

a first emergency switching means located adjacent each fume hood adapted to be activated by a person in the event of a chemical spill or the like, said switching means providing a signal to said fume hood controller means to control the flow modulating means to achieve a predetermined emergency flow rate and providing a signal to the central monitoring station indicating an emergency condition.

18. A system as defined in claim 17 further including:

a second emergency switching means located outside of the room;

room controlling means for controlling at least the volume of air that is supplied to the room from the heating and air conditioning apparatus of the building;

said second emergency switching means providing an emergency signal to said room controlling means and to the fume hood controller means of at least some of the fume hoods in response to a person actuating said second switching means, said fume hood controller means controlling the modulating means to increase the flow rate thereof to a predetermined maximum, said room controlling means controlling the air supply to the room to modulate the flow of air into the room whereby the differential pressure in the room is within the range of about 0.05 and 0.1 inches of water lower than a reference pressure outside of the room, so that any outwardly opening door can be opened by a person inside the room and the differential pressure will not normally force any inwardly opening door open.

19. A system as defined in claim 17 wherein said predetermined emergency flow rate is the maximum flow rate.

20. A system as defined in claim 17 wherein said fume hood controller means operates to provide said predetermined emergency flow rate at a high flow rate for a predetermined time and then reduce the flow rate thereafter.

21. A system for controlling the differential pressure within a room such as a laboratory or the like of the type which has one or more exit doors which can open either inwardly or outwardly of the room, the room being located in a building having a building heating and air conditioning apparatus, including a central monitoring station, the room having a plurality of fume hoods located within it, the fume hoods being of the type which have at least one moveable sash door adapted to at least partially cover the opening as the fume hood sash door is moved, each of the fume hoods having an exhaust duct that is in communication with an exhaust apparatus for expelling air and fumes from the room, said comprising:

a fume hood controller means for controlling a flow modulating means associated with each fume hood and its associated exhaust duct to provide the greater of the flow required to maintain a predetermined minimum flow through said exhaust duct or to maintain a desired face velocity through the uncovered portion of the opening;

said flow modulating means associated with each fume hood and adapted to control the air flow through the fume hood;

a first emergency switching means located adjacent each fume hood adapted to be activated by a person in the event of a chemical spill or the like, said switching means providing a signal to said fume hood controller means to control the flow modulating means to achieve a predetermined emergency flow rate;

a second emergency switching means located outside of the room;

room controlling means for controlling at least the volume of air that is supplied to the room from the heating and air conditioning apparatus of the building;

said second emergency switching means providing an emergency signal to said room controlling means and to the fume hood controller means of at least some of the fume hoods in response to a person actuating said second switching means, said fume hood controller means controlling the modulating means to increase the flow rate thereof to a predetermined maximum, said room controlling means controlling the air supply to the room to modulate the flow of air into the room whereby the differential pressure in the room is within the range of about 0.05 and 0.1 inches of water lower than a reference pressure outside of the room, so that any outwardly opening door can be opened by a person inside the room and the differential pressure will not normally force any inwardly opening door open.

22. A system as defined in claim 21 wherein said predetermined emergency flow rate is the maximum flow rate.

23. A system as defined in claim 21 wherein said fume hood controller means operates to provide said predetermined emergency flow rate at a high flow rate for a predetermined time and then reduce the flow rate thereafter.

24. Apparatus for controlling the air flow through a fume hood to maintain a predetermined average face velocity through an uncovered portion of an opening of a fume hood of the type which has at least one moveable sash door adapted to cover the opening as the fume hood sash door is moved, the fume hood being in communication with an exhaust duct for expelling air and fumes from the fume hood, said apparatus comprising:

means for detecting the position of each moveable sash door and generating a position signal that is indicative of the sash door position;

means responsive to said position signals for calculating the size of the uncovered portion of the opening;

means for measuring the actual flow of air through the exhaust duct and generating an actual flow signal that is indicative of the actual flow of air through the exhaust duct;

modulating means for varying the flow of air through the exhaust duct responsive to a control signal being received from a controller means;

controller means responsive to said position signals and said actual flow signal for controlling the flow modulating means to generate the greater of a predetermined minimum flow rate signal value or a desired flow rate signal value as a function of the calculated size of the uncovered portion, said desired flow rate signal corresponding to a flow rate that is sufficient to maintain the predetermined average face velocity through the uncovered portion of the opening, said controller means comparing said desired flow rate signal and said actual flow rate signal and generating an error signal indicative of any error that exists by taking a plurality of successive measurement samples of said actual flow rate, determining at least two distinct factors of said error signal from said successive samples and summing the said factors to generate said error signal, said controller means generating and outputting a control signal to said modulating means for selectively reducing said error signal to a predetermined minimum value when said actual flow rate signal exceeds said predetermined minimum flow rate signal value or providing a predetermined minimum flow rate.

25. Apparatus as defined in claim 24 wherein the fume hood has one sash door that is moveable in a vertical direction to selectively cover and uncover the opening, said detecting means comprising an elongated resistance means located adjacent the sash door adapted to be contacted at different positions along its length by actuator means associated with said sash door as the door is moved vertically, said position signal being generated by said detecting means comprising a voltage level that is indicative of the position of said sash door.

26. Apparatus as defined in claim 24 wherein the fume hood has a plurality of sash doors that are moveable in at least a horizontal direction to selectively cover and uncover the opening, said detecting means comprising an elongated resistance means located adjacent the sash doors adapted to be contacted at different positions along its length by actuator means associated with each sash door as each sash door is horizontally moved, said position signals being generated by said detecting means comprising voltage levels that are indicative of the horizontal positions of each sash door.

27. Apparatus as defined in claim 26 wherein said plurality of sash doors are mounted in a frame means that is moveable in a vertical direction, said detecting means further comprising a second elongated resistance means located adjacent the frame means adapted to be contacted at different positions along its length by actuator means associated with said frame means as said frame means is vertically moved, said position signals being generated by said detecting means also comprising voltage levels that are indicative of the vertical position of each sash door.

28. Apparatus as defined in claim 24 wherein said modulating means comprises a motor driven blower means wherein said motor is controlled by a motor in order to vary the exhaust air flow in the duct.

29. Apparatus as defined in claim 24 wherein said modulating means comprises a damper means located in the exhaust duct and actuating means for varying the position of the damper means to thereby vary the flow of air through the exhaust duct.

30. Apparatus as defined in claim 24 wherein said air flow measuring means comprises a flow sensor.

31. Apparatus as defined in claim 24 wherein said controller means determines three distinct factors of said error signal from said successive samples and sums the said factors to generate said error signal, said factors comprising a proportional action factor, an integral action factor and a derivative action factor.

32. Apparatus as defined in claim 31 wherein said integral action factor at any given time is directly proportional to the integral action factor calculated from the immediately prior sample multiplied by a loop cycle time, plus any error measured by the present sample.

33. Apparatus as defined in claim 31 wherein said derivative action factor at any given time is directly proportional to the difference between any error determined from the immediately prior sample and the current sample divided by a loop cycle time.

34. Apparatus as defined in claim 31 wherein said proportional action factor at any given time is directly proportional to any error determined from the current sample.

35. Apparatus as defined in claim 31 wherein said modulating means comprises a motor driven blower means wherein said motor is controlled by a motor controller adapted to vary the speed of the motor, said controller means generating a feed forward control signal for said modulating means and inhibiting any error signal generation in response to a sash door being moved, said feed forward control signal predicting the actual flow rate of air through the exhaust duct as a function of the calculated size of the uncovered portion, said controller means thereafter causing the inhibiting of any error signal generation.

36. Apparatus as defined in claim 35 wherein said feed forward control signal at any given time comprises an intercept value plus a slope value multiplied by a predetermined set flow value.

37. Apparatus as defined in claim 24 further including an operator panel adapted to be mounted on the fume hood in position to be observed by a person, said operator panel including display means for displaying the average face velocity being calculated for the associated fume hood, and for displaying other status information relative to the operation of the apparatus.

38. Apparatus as defined in claim 37 wherein said operator panel includes means for placing said controller in one of two modes of operation, one mode being a day mode and the other a night mode, said controller means including memory means for storing information relative to the operation of said apparatus, said controller means being adapted to receive separate predetermined average face velocity values for each of said day and night modes.

39. Apparatus as defined in claim 38 wherein said operator panel includes connector means adapted to be connected to a computer means of the type which has a keyboard, the computer means being capable, when connected to the operator panel, of defining parameters and operating values of the fume hood to which the apparatus is to control.

40. Apparatus as defined in claim 39 wherein said parameters and operating values include the number of sash doors and the possible movement of such sash doors, the physical dimensions of the sash doors and of the opening of the fume hood, the average face velocity for day and night modes.

41. Apparatus as defined in claim 24 wherein said means for calculating the size of the uncovered portion of the opening comprises computing means located within said controller means.

42. Apparatus for controlling the air flow through a plurality of fume hoods to maintain a predetermined average face velocity through an uncovered portion of an opening of each fume hood, each fume hood being of the type which has at least one moveable sash door adapted to selectively cover the opening as the fume hood sash door is moved, each fume hood in communication with an exhaust duct for expelling air and fumes from each fume hood, the exhaust ducts for each fume hood being in communication with an exhaust system, said apparatus comprising:

means associated with each fume hood for detecting the position of each moveable sash door and generating a position signal that is indicative of the position of such sash door;

means responsive to said position signals for calculating the size of the uncovered portion of the opening of each fume hood;

means for measuring the actual flow of air through the exhaust duct in communication with each fume hood and generating an actual flow signal that is indicative of the actual flow of air through the exhaust duct;

modulating means associated with each fume hood for varying the flow of air through the exhaust duct that is in communication with the respective fume hood responsive to a control signal being received from a controller means;

controller means responsive to said position signals and said actual flow signal for controlling the flow modulating means associated with each respective fume hood to generate a desired flow rate signal as a function of the calculated size of the uncovered portion, said desired flow rate signal corresponding to a flow rate that is sufficient to maintain the predetermined average face velocity through the uncovered portion of the opening of each fume hood, said controller means comparing said desired flow rate signal and said actual flow rate signal for each fume hood and generating an error signal indicative of any errors that exist by taking a plurality of successive measurement samples of said actual flow rate, determining at least two distinct factors of said error signal from said successive samples and summing the said factors to generate said error signal, said controller means outputting a control signal to said modulating means associated with each fume hood for selectively reducing said error signal to a predetermined minimum value or maintaining a predetermined minimum actual flow.

43. Apparatus as defined in claim 42 wherein said controller means determines three distinct factors of said error signal from said successive samples and sums the said factors to generate said error signal, said factors comprising a proportional action factor, an integral action factor and a derivative action factor.

44. Apparatus as defined in claim 42 wherein said integral action factor at any given time is directly proportional to the integral action factor calculated from the immediately prior sample multiplied by a loop cycle time, plus any error measured by the present sample.

45. Apparatus as defined in claim 42 wherein said derivative action factor at any given time is directly proportional to the difference between any error determined from the immediately prior sample and the current sample divided by a loop cycle time.

46. Apparatus as defined in claim 42 wherein said proportional action factor at any given time is directly proportional to any error determined from the current sample.

47. Apparatus as defined in claim 42 wherein said modulating means comprises a damper means located in the exhaust duct and actuating means for varying the position of the damper means to thereby vary the flow of air through the exhaust duct.

48. Apparatus as defined in claim 43 wherein said measurement samples are taken generally every 100 milliseconds.

49. Apparatus as defined in claim 43 wherein position detecting means operates to generate a position signals generally every 200 milliseconds.

50. Apparatus as defined in claim 43 wherein said controller means generates said control signal generally every 100 milliseconds.

51. Apparatus for controlling the air flow through a fume hood to maintain a predetermined average face velocity through an uncovered portion of an opening of a fume hood of the type which has at least one moveable sash door adapted to cover the opening as the fume hood sash door is moved, the fume hood being in communication with an exhaust duct for expelling air and fumes from the fume hood, said apparatus comprising:

means for detecting the position of each moveable sash door and successively generating a position signal that is indicative of the position of each sash door;

means responsive to said position signals for calculating the size of the uncovered portion of the opening;

means for successively generating an actual flow signal that is indicative of the actual flow of air through the exhaust duct;

modulating means for varying the flow of air through the exhaust duct responsive to a control signal being received from a controller means;

controller means responsive to said position signals and said actual flow signal for controlling the flow modulating means, said controller means either generating a control signal value that maintains a predetermined minimum flow rate or generating a desired flow rate signal as a function of the calculated size of the uncovered portion, said desired flow rate signal corresponding to a flow rate that is sufficient to maintain the predetermined average face velocity through the uncovered portion of the opening, said controller means generally continuously comparing said desired flow rate signal with successive instantaneous sample values of said actual flow signal and generating an error signal having a magnitude that is directly proportional to the sum of any calculated integration error, any calculated derivative error and any calculated proportional error, said controller means successively generating and outputting a control signal to said modulating means for reducing said error signal to a predetermined minimum value or maintaining said predetermined minimum actual flow.

52. Apparatus as defined in claim 51 wherein said measurement samples are taken generally every 100 milliseconds.

53. Apparatus as defined in claim 51 wherein position detecting means operates to generate a position signals generally every 200 milliseconds.

54. Apparatus as defined in claim 51 wherein said controller means generates said control signal generally every 100 milliseconds.

* * * * *